United States Patent
Schmitz et al.

(10) Patent No.: US 10,127,179 B2
(45) Date of Patent: Nov. 13, 2018

(54) METHOD FOR OPERATING A TRANSCEIVER OF A BUS PARTICIPANT CONNECTED TO A DATA BUS

(71) Applicant: ELMOS Semiconductor AG, Dortmund (DE)

(72) Inventors: Christian Schmitz, Dortmund (DE); Radoslaw Watroba, Dachau (DE)

(73) Assignee: ELMOS SEMICONDUCTOR AG, Dortmund (DE)

( * ) Notice: Subject to any disclaimer, the term of this patent is extended or adjusted under 35 U.S.C. 154(b) by 221 days.

(21) Appl. No.: 14/414,730

(22) PCT Filed: May 2, 2013

(86) PCT No.: PCT/EP2013/059123
§ 371 (c)(1),
(2) Date: Jan. 14, 2015

(87) PCT Pub. No.: WO2014/012688
PCT Pub. Date: Jan. 23, 2014

(65) Prior Publication Data
US 2015/0178240 A1 Jun. 25, 2015

(30) Foreign Application Priority Data
Jul. 16, 2012 (EP) .................................... 12176545

(51) Int. Cl.
*G06F 13/40* (2006.01)
*G06F 13/42* (2006.01)
(Continued)

(52) U.S. Cl.
CPC ...... *G06F 13/4221* (2013.01); *G06F 13/4068* (2013.01); *H04L 12/40032* (2013.01); *H04L 41/0813* (2013.01); *H04L 49/30* (2013.01)

(58) Field of Classification Search
CPC .......... G06F 13/40; G06F 13/42; G06F 15/16; H04L 12/413; H04L 41/0813; H04L 49/30; H04L 12/40032
See application file for complete search history.

(56) References Cited

U.S. PATENT DOCUMENTS

| 7,424,553 B1 * | 9/2008 | Borrelli | H04L 49/90 709/230 |
| 7,539,888 B2 * | 5/2009 | Hu | H04L 12/40039 713/320 |

(Continued)

OTHER PUBLICATIONS

International Search Report and Written Opinion for corresponding patent application No. PCT/EP2013/059123 dated Jul. 29, 2013.

*Primary Examiner* — Henry Tsai
*Assistant Examiner* — Christopher A Daley
(74) *Attorney, Agent, or Firm* — Renner Otto Boisselle and Sklar

(57) ABSTRACT

The method is used for operating a transceiver of a bus participant connected to a data bus, the arrangement additionally having a control unit, wherein the transceiver is connected between the data bus and the control unit and obtains commands and operating data for its operation in accordance with the bus protocol, and receives and transmits useful data via the data bus. For its operation in this method, the transceiver receives, at its inputs and/or outputs provided for the useful data and connected to the data bus and the control unit, commands from the control unit or transmitted via the data bus, and is operated accordingly if such a command is received.

12 Claims, 1 Drawing Sheet

Figure 1:
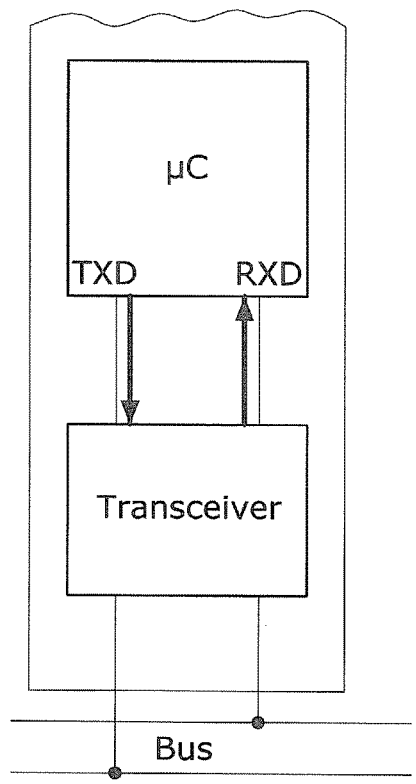

(51) Int. Cl.
*H04L 12/40* (2006.01)
*H04L 12/935* (2013.01)
*H04L 12/24* (2006.01)

(56) References Cited

U.S. PATENT DOCUMENTS

| | | | | |
|---|---|---|---|---|
| 8,185,678 B1* | 5/2012 | Azad | ................ | G06F 13/405 710/104 |
| 8,321,612 B2* | 11/2012 | Hartwich | ............ | H04J 3/0655 710/110 |
| 9,262,365 B2* | 2/2016 | Hartwich | ......... | H04L 12/40032 |
| 9,330,045 B2* | 5/2016 | Muth | ................ | G06F 13/4072 |
| 2003/0058882 A1* | 3/2003 | Fleury | ............ | H04L 12/40026 370/445 |
| 2003/0167345 A1* | 9/2003 | Knight | ............ | B60R 16/0315 709/249 |
| 2004/0020698 A1* | 2/2004 | Gehrke | ............ | B60K 31/0008 180/170 |
| 2005/0097212 A1* | 5/2005 | Engel | ............ | H04L 69/14 709/230 |
| 2006/0045123 A1* | 3/2006 | Gopalan | ............ | H04L 12/4625 370/465 |
| 2006/0252375 A1* | 11/2006 | Wu | ............ | G01R 31/3025 455/67.11 |
| 2008/0291986 A1* | 11/2008 | Lida | ............ | H04L 27/0008 375/222 |
| 2009/0327506 A1 | 12/2009 | Diab | | |
| 2010/0111081 A1 | 5/2010 | Diab | | |
| 2010/0229013 A1 | 9/2010 | Diab | | |
| 2011/0007896 A1* | 1/2011 | Chen | ............ | H04L 63/18 380/33 |
| 2011/0022766 A1* | 1/2011 | Beckmann | ......... | H04L 12/40032 710/305 |
| 2011/0249713 A1* | 10/2011 | Hammarwall | ....... | H04B 7/0634 375/220 |
| 2012/0282875 A1* | 11/2012 | Park | ............ | H04W 4/22 455/404.1 |
| 2014/0046494 A1* | 2/2014 | McAlister | ............ | G06F 1/26 700/287 |

* cited by examiner

METHOD FOR OPERATING A TRANSCEIVER OF A BUS PARTICIPANT CONNECTED TO A DATA BUS

The invention relates to a method for operating a transceiver of a bus participant connected to a data bus, or, expressed differently, a method for the transceiver management of a bus participant. Particularly, the invention relates to a method for configuration, state control and diagnosis of transceivers exclusively via their data bus communication interfaces.

Technical solutions for networks often require configuration, diagnosis and state control of the transceivers of the data bus participants of the network. A transceiver is understood to be the interface between a data bus and a microcontroller of the participant.

In present-day configuration interfaces, use is made either of standardized interfaces such as e.g. SPI, I2C, or other proprietary interfaces. The transceiver pins (TXD/RXD) are normally used exclusively for communication of useful data via the data bus.

The methods that up to now have been normally used for operational control of transceivers will require additional (control) pins on the transceivers, which often have to be provided exclusively for this purpose. Due to the advancing miniaturization, an ever more frequent demand exists for very small housings with only few IC pins while, nonetheless, the wish exists to have all degrees of freedom of configurability, state control and diagnosis of transceivers.

It is an object of the invention to provide a method for operating a transceiver of a bus participant connected to a data bus which makes it possible, even in case of a reduced number of terminals, i.e. IC pins, to control the transceiver with respect to its operation and its operational settings as had been the case before.

To achieve the above object, the invention proposes a method for operating a transceiver of a bus participant connected to a data bus, the bus participant further comprising a control unit (e.g. microcontroller, state machine, hard-wired logic), and the transceiver being connected between the data bus and the control unit and, according to a bus protocol, being supplied with instructions and operating data for its operation and receiving and transmitting useful data via the data bus, wherein, in the method of the invention, the transceiver, for its operation, is operative to receive, at its inputs and/or outputs which are provided for the useful data and are connected to the data bus and the control unit, instructions transmitted by the control unit or via the data bus and, upon receipt of such an instruction, is operated (e.g. configured) in accordance with these instructions.

By the invention, it is proposed in a general sense that the operational control (i.e. the management), i.e. particularly the configuration, diagnosis and state control of the transceiver, will be realized by the useful-data communication interface which exists in any case, and will be realized both for locally performed operational control and for operational control via the data bus. Thus, according to the invention, control pins and the like terminals on the side of the transceiver can be omitted. The transceiver will evaluate the communication, which communication can also be performed e.g. in accordance with the communication protocol depending on the type of data bus, and will interpret the contents of specific instructions—these may be provided e.g. also for communication of useful data—as requests for configuration, state control and/or diagnosis—and respectively for the transceiver management in general. Diagnosis information transmitted by the transceiver can be transmitted both locally and on the bus side on the communication interface of the transceiver, both toward the control unit and to the data bus.

For hardware realization of the method of the invention, it is required that the bus participant and respectively the transceiver are provided with a logic unit which is capable to receive the bus communication and the communication from the control unit and to decode it. The transmitted transceiver management data will then be interpreted and used by the transceiver in a product-specific manner.

The invention will be explained in greater detail hereunder by way of several exemplary embodiments thereof and with reference to the drawing. Specifically, the following is illustrated in the drawing:

FIGS. 1 to 4 show four different scenarios for transceiver management, wherein thin-lined single or double arrows represent an unidirectional and respectively bidirectional communication of useful data, and thicker-lined single or double arrows represent an unidirectional and respectively bidirectional communication of management data via the internal connection terminals TXD and RXD of a bus participant and respectively via the bus terminals of the bus participant/transceiver.

FIG. 1 illustrates the case of a local transceiver management related to both management data and useful data, wherein the transmitting of management and useful data from the transceiver to the data bus as well as the receiving of data on the transceiver side from the data bus are deactivated. Herein, for operating the transceiver of the bus participant, the control unit of the bus participant, which in the present example is realized as a microcontroller µC, will locally communicate operating data with the transceiver, wherein bus communication of the transceiver with the data bus with respect to operating data is prevented and wherein communication of useful data between the data bus and the transceiver and/or between the transceiver and the microcontroller is prevented in both directions.

The transceiver management communication is performed bidirectionally between the communication/control unit and the transceiver, wherein the communication or generally the transceiver management on the bus side, i.e. toward the data bus, is "not visible", i.e. there is no communication. The communication/control unit does not participate in the external data bus communication. The transceiver will decode the management data coming from the microcontroller and will use them in an application-specific manner.

As a possible application, one can envision e.g. the configuring of the transceiver via the local communication interface (between transceiver and microcontroller) e.g. during initialization of a control device of the respective participant, with said control device not yet participating in the data bus communication. The configuration of the transceiver is exclusively performed locally. For instance, this can be the case always when a bus participant is being prepared for a specific operational state, e.g. with respect to the assignment of the ID and of the data contents in the—e.g. partial—network which is to be responded to, wherein the control device shall not actively participate in the bus communication. After e.g. a transceiver error has been detected, this transceiver and respectively the participant will be decoupled from the rest of the network, and the cause of the error can be locally detected. Further, by way of dedicated messages, the functional state of the transceiver can be locally determined, without the necessity of an active participation in the bus communication.

Figure 2:
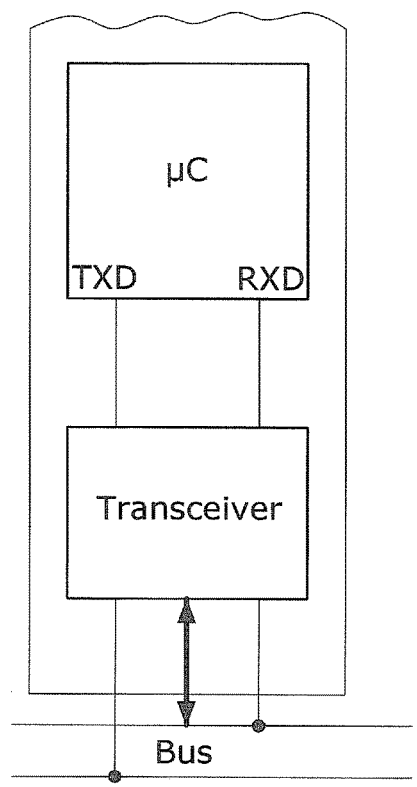

FIG. 2 illustrates the scenario for a transceiver management on the bus side, i.e. a transceiver management controlled via the data bus (listen only, no forwarding of the management data to the microcontroller, also no reception of useful data from the data bus and respectively no transmission of useful data onto the data bus). Herein, it is provided that, via the data bus, the transceiver of the bus participant will bidirectionally communicate operational and respectively management data, while local communication between the transceiver of the bus participant and the microcontroller of the latter with respect to operational data as well as useful data is prevented.

According to the scenario depicted in FIG. 2, transceiver management data are bidirectionally communicated from the data bus to the transceiver, wherein the communication to the bus is performed in a transparent manner, i.e. from the bus and respectively to the bus, but not to the communication/control unit of the microcontroller. The transceiver will decode the management data and will use them in an application-specific manner.

As a possible application, there could be envisioned e.g. a bus-sided diagnosis of the transceiver while the local control device of the participant is in the switched-off state. Nonetheless, the transceiver is ready for reception, notably for management data coming from the data bus, and respectively for transmission of management data and respectively for their acknowledgement on the data bus. The transceiver can e.g. be polled from a remote site with respect to diagnosis information (e.g. state inquiry by the network management). It is possible to configure the transceiver from the bus side. If, for instance, the control device is in a state wherein only the transceiver is ready for reception, the transceiver can be provided with configuration data from a remote site (e.g. changing the configuration in the—e.g. partial—network by the network management). Also a diagnosis of the transceiver is possible from the bus side. While the local control device is in the switched-off state whereas the transceiver is ready for reception, the transceiver can be polled from a remote site for diagnostic purposes (e.g. state inquiry by the network management).

Figure 3:
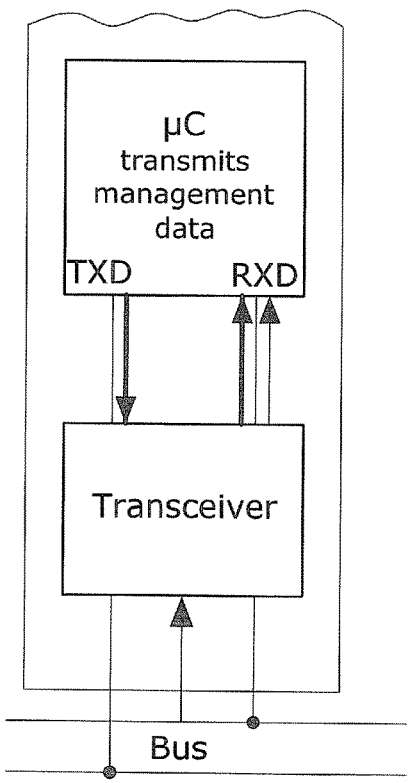

FIG. 3 illustrates a scenario for local transceiver management in a situation where the control device is ready for reception of useful data. In this scenario, the microcontroller will locally communicate operating data with the transceiver for operating the same, wherein bus communication of the transceiver with the data bus with respect to operational and respectively management data is prevented and wherein there takes place a unidirectional communication of useful data between the data bus and the transceiver forwarding these useful data to the microcontroller, and a unidirectional communication of useful data between the transceiver and the microcontroller, without the transceiver communicating useful data to the bus.

The transceiver management-data communication from the communication/control unit of the microcontroller to the transceiver is possible, wherein the configuration toward the data bus is not "visible" while, however, the ECU of the transceiver remains capable of reception (in analogy to "listen only"). The transceiver will decode these management data and will use them in an application-specific manner. An application can reside, for instance, as described above in connection with FIG. 1, in a local configuration/diagnosis of the transceiver, with the data transmission channel of the control device of the participant remaining ready for transmission and reception. Thereby, the external bus communication as well as configuration and diagnosis requests can be received. Additionally, the microcontroller can react on them and locally deliver corresponding configuration and diagnosis messages which are exclusively assigned to the transceiver, i.e. are not "visible" on the data bus. Herein, for instance, a remotely situated control device of another participant can transmit network management messages which, by the local unit, i.e. the participant considered here, will be correspondingly converted into a local configuration/diagnosis of its transceiver.

Figure 4:
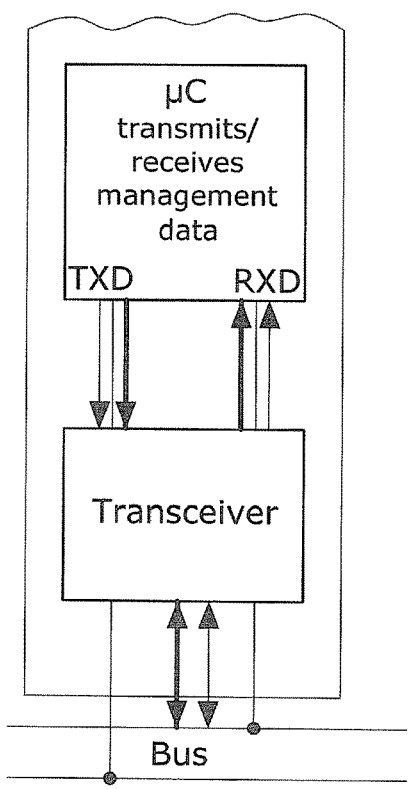

FIG. 4 finally shows an example of a transparent transceiver management wherein, for operating the transceiver of the bus participant, the microcontroller of the bus participant will locally communicate operating data with the transceiver, wherein bus communication of the transceiver with the data bus with respect to operational data is prevented, the operational settings of the transceiver are communicated with the data bus and useful data are communicated between the data bus and the microcontroller via the transceiver in both directions.

Transceiver management-data communication is possible bidirectionally between the communication/control unit of the microcontroller and the transceiver, wherein the configuration is transparently "visible" on the data bus. The transceiver will decode these management data and will use them in an application-specific manner. As a possible application, there could be envisioned the case of an external control device which transmits network management data that will be decoded and converted by the transceiver of another participant. The local microcontroller of the addressed participant (i.e. the microcontroller within the participant) will receive these data in parallel. Further, the transceiver management can take place locally (i.e. within the participant), wherein these management data are "visible" in the entire network.

The invention claimed is:

1. A method for operating a transceiver of a bus participant connected to a data bus, the bus participant further comprising a control unit, the transceiver being connected between the data bus and the control unit and, according to a bus protocol, being supplied with instructions and operating data for its operation and receiving and transmitting useful data via the data bus, wherein, in said method
    the transceiver, for its operation, is operative to receive, at its inputs and/or outputs which are provided for the useful data and are connected to the data bus and the control unit, a plurality of instructions transmitted by the control unit or via the data bus and, upon receipt of an instruction of the plurality of instructions, an operating mode of the transceiver is set in accordance with the instructions.

2. The method according to claim 1, wherein the instructions for operating the transceiver are instructions for state control, configuration and/or diagnosis of the transceiver.

3. The method according to claim 1, wherein, for operating the transceiver of the bus participant, the control unit of the bus participant is operative to locally communicate operating data with the transceiver, while communication of the transceiver with the data bus with respect to operating data is prevented and communication of useful data between the data bus and the transceiver and/or between the transceiver and the microcontroller is prevented in both directions.

4. The method according to claim 1, wherein the transceiver of the bus participant is operative to bidirectionally communicate operational data via the data bus, while local communication between the transceiver of the bus participant and the control unit of the bus participant with respect to operating data and useful data is prevented.

5. The method according to claim 1, wherein, for operating the transceiver of the bus participant, the control unit of the bus participant is operative to locally communicate operating data with the transceiver, while bus communication of the transceiver with the data bus with respect to operating data is prevented, unidirectional communication of useful data takes place between the data bus and the transceiver forwarding these useful data to the control unit of the bus participant, and unidirectional communication of useful data takes place between the transceiver of the bus participant and the microcontroller of the bus participant, without the transceiver communicating useful data to the bus.

6. The method according to claim 1, wherein, for operating the transceiver of the bus participant, the control unit of the bus participant is operative to locally communicate operating data with the transceiver, while bus communication of the transceiver with the data bus with respect to operating data is prevented, the operational settings of the transceiver being communicated with the data bus and useful data being communicated between the data bus and the control unit via the transceiver in both directions.

7. A method for operating a transceiver of a bus participant connected to a data bus, the bus participant further comprising a control unit, wherein the transceiver includes a first data bus port connected to the data bus and a second data bus port connected to the controller, wherein useful data is communicated between the control unit and the data bus through the first and second data bus ports and, according to a bus protocol, the transceiver, via the first and second data bus ports, being supplied with instructions and operating data for its operation and receiving and transmitting payload data, the method comprising:
receiving by the transceiver via at least one of the first and second data bus ports, instructions transmitted from the control unit or via the data bus, the instructions corresponding to an operating mode of the transceiver; and
subsequent to receipt of the instructions, setting the operating mode of the transceiver based on the received instructions.

8. The method according to claim 7, wherein the instructions for operating the transceiver are instructions for state control, configuration and/or diagnosis of the transceiver.

9. The method according to claim 7, wherein, for operating the transceiver of the bus participant, the control unit of the bus participant is operative to locally communicate operating data with the transceiver, while communication of the transceiver with the data bus with respect to operating data is prevented and communication of useful data between the data bus and the transceiver and/or between the transceiver and the microcontroller is prevented in both directions.

10. The method according to claim 7, wherein the transceiver of the bus participant is operative to bidirectionally communicate operational data via the data bus, while local communication between the transceiver of the bus participant and the control unit of the bus participant with respect to operating data and useful data is prevented.

11. The method according to claim 7, wherein, for operating the transceiver of the bus participant, the control unit of the bus participant is operative to locally communicate operating data with the transceiver, while bus communication of the transceiver with the data bus with respect to operating data is prevented, unidirectional communication of useful data takes place between the data bus and the transceiver forwarding these useful data to the control unit of the bus participant, and unidirectional communication of useful data takes place between the transceiver of the bus participant and the microcontroller of the bus participant, without the transceiver communicating useful data to the bus.

12. The method according to claim 7, wherein, for operating the transceiver of the bus participant, the control unit of the bus participant is operative to locally communicate operating data with the transceiver, while bus communication of the transceiver with the data bus with respect to operating data is prevented, the operational settings of the transceiver being communicated with the data bus and useful data being communicated between the data bus and the control unit via the transceiver in both directions.

* * * * *